(12) United States Patent
Ichikawa et al.

(10) Patent No.: US 8,051,262 B2
(45) Date of Patent: Nov. 1, 2011

(54) STORAGE SYSTEM STORING GOLDEN IMAGE OF A SERVER OR A PHYSICAL/VIRTUAL MACHINE EXECUTION ENVIRONMENT

(75) Inventors: Naoko Ichikawa, San Jose, CA (US); Yasunori Kaneda, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 448 days.

(21) Appl. No.: 12/411,293

(22) Filed: Mar. 25, 2009

(65) Prior Publication Data
US 2010/0250878 A1      Sep. 30, 2010

(51) Int. Cl.
*G06F 12/00* (2006.01)
(52) U.S. Cl. ........ 711/162; 711/154; 711/170; 711/114; 711/E12.001
(58) Field of Classification Search .......................... None
See application file for complete search history.

(56) References Cited

U.S. PATENT DOCUMENTS

| | | | |
|---|---|---|---|
| 7,035,973 B2* | 4/2006 | Asahi | 711/114 |
| 2004/0205293 A1* | 10/2004 | Asahi | 711/114 |
| 2008/0082749 A1 | 4/2008 | Kumagai | |
| 2008/0114955 A1 | 5/2008 | Kitayama et al. | |

* cited by examiner

*Primary Examiner* — Kevin Verbrugge
(74) *Attorney, Agent, or Firm* — Hitachi America, Ltd.

(57) ABSTRACT

A storage system stores golden image of a server or any physical/virtual machine execution environment and associate the golden image and the storage port. The storage system also creates the copy of the golden image to the logical volume, and allocates the internal path between the storage port and the logical volume. Upon receiving an access request from the host computer via the storage port, the storage system transfers the access request between the storage port and the logical volume which stores the copy of golden image associated with the host computer.

20 Claims, 23 Drawing Sheets

Golden Image Management Table 157

| Golden Image Name | Logical Volume ID | Operating System | Installed Application |
|---|---|---|---|
| Server2k8_Eml07 | 00:0A | Server OS 2008 | E-mail app - 2007 |
| Server2k3_DB05 | 00:0B | Server OS 2003 | DBServer2005 |
| Server2k8_DB05 | 00:0C | Server OS 2008 | DB Server2005 |
| 1570 | 1571 | 1572 | 1573 |

Fig. 5

Port Attribute Management Table 158

| Port ID | Golden Image Name |
|---------|-------------------|
| A01 | Server2k8_Eml07 |
| A02 | Server2k8_Eml07 |
| B01 | Server2k3_DB05 |
| B02 | Server2k8_DB05 |

Path Management Table 159

| Logical Volume ID | Port ID |
|---|---|
| 01:01 | 01A |
| 01:02 | 01B |
| 01:03 | 02A |
| 01:04 | 02B |

LUN Mapping Table 15a

| Host port WWN | Storage port ID | Logical Volume ID |
|---|---|---|
| 50011111200251f1 | A01 | 01:01 |
| 5001300122c20000 | A02 | 01:02 |
| 1b10166122221lf1 | B01 | 01:03 |
| 1bc210000302111g | B02 | 01:04 |

Fig. 9 Overall procedure to set up storage system

Golden Image List

| Golden Image ID | OS | AP | Port |
|---|---|---|---|
| Server2k8_Eml07 | Server OS 2008 | E-mail app - 2007 | A01, A02 |
| Server2k3_DB05 | Server OS 2008 | E-mail app - 2007 | B01 |
| Server2k3_DB05 | Server OS 2003 | DB Server 2005 | B02 |

Fig. 17

STORAGE SYSTEM STORING GOLDEN IMAGE OF A SERVER OR A PHYSICAL/VIRTUAL MACHINE EXECUTION ENVIRONMENT

BACKGROUND OF THE INVENTION

The present invention relates generally to constructing, provisioning and managing server and storage in SAN environment.

Recently, complexity of constructing, provisioning and managing server and storage system is the primary concerns in business enterprises. For example, administrator has to install a server operating system to each server, set up network options, install and set up necessary applications, configure storage area network (SAN), and set up a storage system. Furthermore, the step of storage system set up requires at least configuring logical storage volumes, allocating an internal path to each volumes, setting up security options such as LUN masking, and formatting the volume with appropriate format type.

Server virtualization is increasingly applied in business enterprises due to its ability to consolidate physical servers and improve manageability and utilization ratio of server and storage resources. Server virtualization is a technology that is able to run multiple computing machines virtually on a single physical server. Each virtual machine is stored as a file that is a virtual disk image for each virtual machine. With the server virtualization technology, virtual machines (VMs) can be easily provisioned by distributing copies of master disk image data called "golden image" in which necessary programs or applications are already installed and set up.

However, this VM provisioning method is only concerned with VM image distribution, and cannot be applied for physical server and storage provisioning. Therefore, even with the server virtualization, administrators need to configure and provision physical server and storage system independently.

US2008/0114955 shows a computer system and a method for constructing an access environment to enable access by a host to a logical volume in a storage system, where the user only need to input a designation of logical volume-related condition and the logical volume is allocated to the communication port.

US2008/0082749 show a storage apparatus which uses iSCSI protocol, which makes it possible for each user to configure the necessary setting within the scope of their right without installing software particular to the storage apparatus in each computer, and, in this setting, allocatable capacity of LUs are calculated so that the identified LUs are allocated to the relevant host computers.

Although these technologies provide the solution for the problems of administrating server and storage system in SAN environment, administrators still face a complexity when they configure and manage both server and storage system in the way that they need to install each server and application, and configure storage system every time they introduce or reconfigure a server or application.

BRIEF SUMMARY OF THE INVENTION

Embodiments of the invention provide methods and systems in which the storage system stores golden image of a server or any physical/virtual machine execution environment and associate the golden image and the storage port. The storage system also creates the copy of the golden image to the logical volume, and allocates the internal path between the storage port and the logical volume. The golden image may be created, for example, by installing a server operation system or application, and it may be a SAN boot image or at least one of virtual disk files that are used to provision at least one of virtual machines. The storage system may maintain a port attribute management table and/or a path management table to manage the association between the storage ports and the golden images and the allocation between the storage ports and logical volumes that stores copied data of golden images.

In accordance with an aspect of the present invention, upon receiving an access request from the host computer via the storage port, the storage system transfers the access request between the storage port and the logical volume which stores the copy of golden image. Upon receiving the access request from the host computer, the storage system further checks if the host computer is new access to the storage system, and if the host computer is new, then the storage system further checks if there is a logical volume, which stores a copy of a golden image associated with the accessed port, and if there is the logical volume available, the storage system transfers the access request between the storage port and the logical volume. If there is no logical volume available, the storage system creates a logical volume which stores a copy of the golden image.

In a specific embodiment, the storage port is associated with a single golden image, while, in another embodiment, the storage port is associated with the plurality of the golden images, and, in yet another embodiment, the zone setting in SAN switch is associated with the golden image.

These and other features and advantages of the present invention will become apparent to those of ordinary skill in the art in view of the following detailed description of the specific embodiments.

BRIEF DESCRIPTION OF THE DRAWINGS

FIG. 5 illustrates an example of an example of a Golden Image Management Table in the memory of FIG. 2.

FIG. 6 illustrates an example of a Port Attributable Management Table in the memory of FIG. 2.

FIG. 7 illustrates an example of a Path Management Table in the memory of FIG. 2.

FIG. 8 illustrates an example of a LUN Mapping Table in the memory of FIG. 2.

FIG. 17 illustrates an example of a management window of a Golden Image List.

DETAILED DESCRIPTION OF THE INVENTION

Exemplary embodiments of the invention, as will be described in greater detail below, provide systems, methods and computer programs to construct server and application environment with a special consideration of association between the storage port and the golden image.

First Embodiment

In the 1st embodiment, a computer system and a method in which a storage system stores a golden image of server or any physical/virtual machine execution environment and manages association between golden image and storage port is disclosed. It is assumed that the computer system has a storage system that comprises SAN interface with one or plurality of ports, storage volumes for a golden image and storage volumes for copy of the golden image. Each port is to be associated with one of the golden images. By utilizing this invention, it becomes possible for users to construct server and application environment instantly by connecting the server to the designated storage ports.

The invention described in this embodiment is more efficient when applied to the case in which golden image administrator and actual user who access the storage port is different. Once administrator set up and embed the golden image, the actual user can run a server or any physical/virtual environment instantly by accessing to the designated port.

1. System Structure

Figure 1:
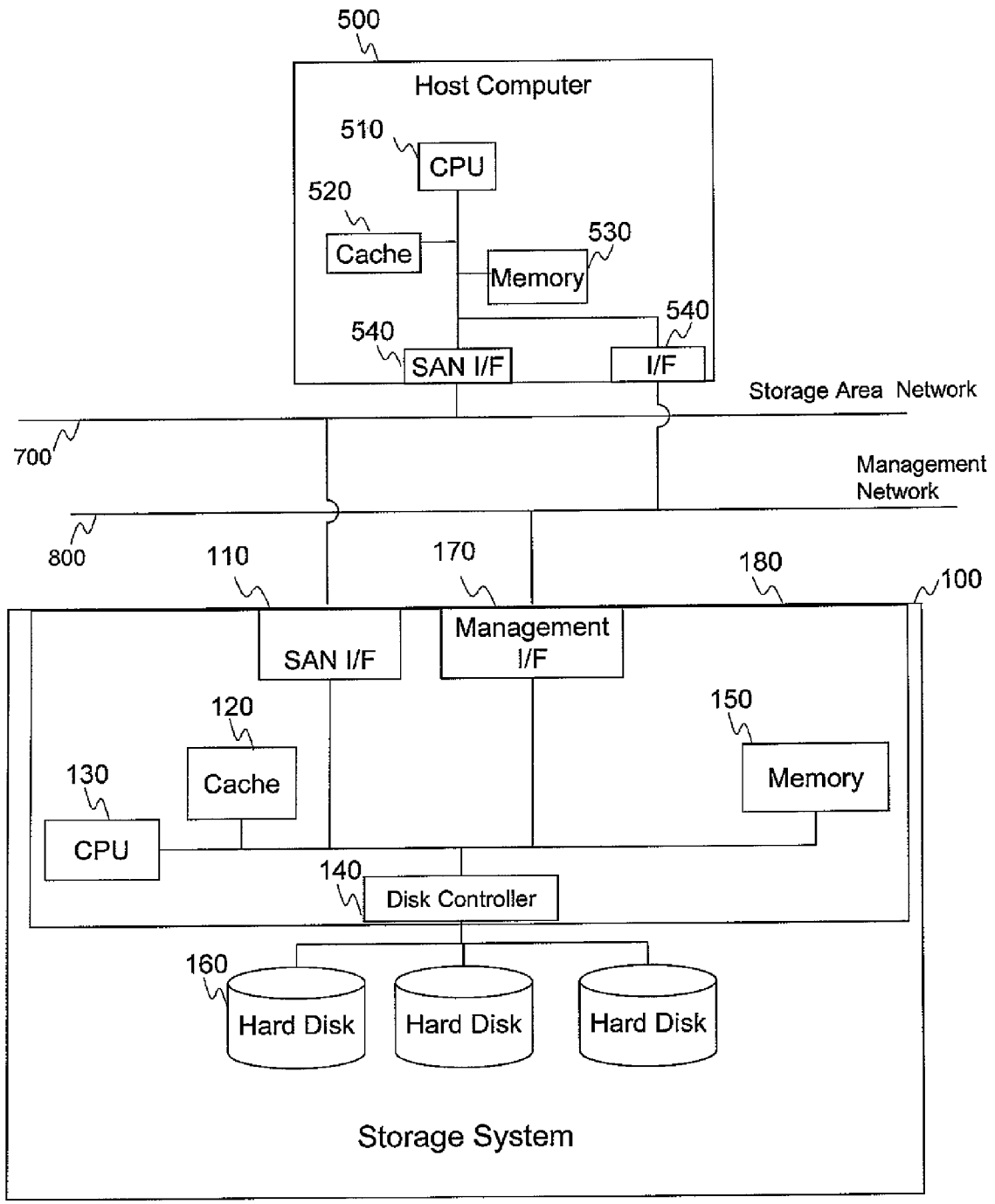
FIG. 1 illustrates an example of a system configuration overview in which the computer system and method of the invention may be applied.

FIG. 1 illustrates an example of a system configuration overview in which the computer system and method of the invention may be applied.

The computer system is comprised of a host computer 500 and a storage system 100 which are connected via a Storage Area Network (SAN) 700 and management network 800.

First, the storage system includes SAN interface 110, management interface 170, a storage controller 180, and one or a plurality of hard disks 160.

A SAN interface 110 is an interface to transfer data to/from a storage area network (SAN) 700 including Ethernet network interface and FC network interface, while a management interface 170 is an interface to transfer data to/from a management network 800. The SAN interface 110 and the management interface 170 can be integrated as one interface. A storage controller 180 includes a cache 120 used for storing a temporary data, a CPU 130 which calls the programs and tables stored in the memory 150 and executes the programs, a disk controller 140 for controlling associated disks, and a memory 150 for storing the programs and tables read by the CPU 130. Hard disks 160 are one or plurality of hard disks, and a plurality of hard disks can make a RAID configuration for redundancy. The group of hard disks for a single RAID configuration is called a "parity group" and an identification number is assigned to each parity group. These group of hard disks are used as logically separate volumes as "logical volumes".

The host computer 500 includes a CPU 510 that controls the operation of the host computer 500, a cache 520 for storing data temporarily, a memory 530 for storing programs and tables read and used by the CPU 510 to manage the operation of the host computer 500, an interface 540 that transmits data to and receives data from a storage area network 700 and a management network 800. It includes an interface for the Ethernet network interface and an FC network interface.

The storage area network 700 is a network used to transfer user data between the host computer 500 and the storage system 100. For example, a transaction data created by users on the host computer 500 are transferred via the storage are network 700 to the storage system 100 in order to store the data. The storage area network 700 can be either FC network or iSCSI network. The management network 800 is a network used to transfer a management information regarding the computer system. The host computer 500 and the storage system 100 mutually transmit and receive the management information via the management network 800.

Figure 2:
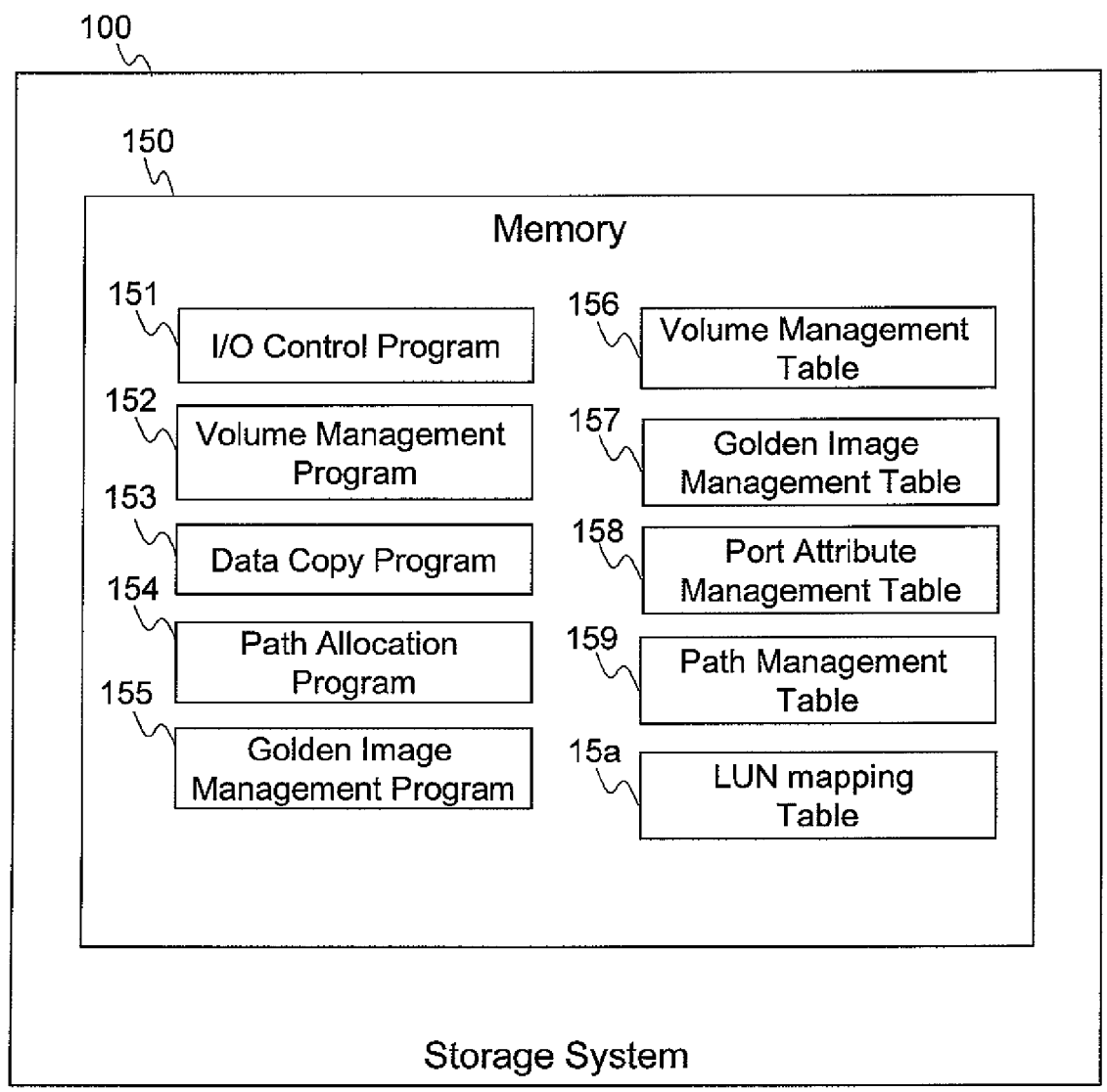
FIG. 2 illustrates an example of a memory in the storage system of FIG. 1.

FIG. 2 illustrates an example of a memory 150 in the storage system 100 of FIG. 1. The memory 150 contains a I/O control program 151 for making I/O control in the storage system 100, a volume management program 152 for creating or deleting logical volumes in the storage system 100 and for updating a volume management table 156, a data copy program 153 for copying data from source logical volumes to destination logical volumes based on a copy request, a path allocation program 154 for allocating a data path between storage ports and logical volumes by updating a path management table 159, and a golden image management program 155 for managing a golden image data and its related information. The memory 150 also contains the volume management table 156 which contains information of volumes to manage a volume configuration, a golden image management table 157 which contains management information of a golden image, a port attribute management table 158 which contains information for a port attribute that is defined for each port of the SAN interface 110 in the storage system 100, the path management table 159 which contains information of an allocated path within the storage system 100, and a LUN mapping table 15a which contains information of LUN mapping.

Figure 4:
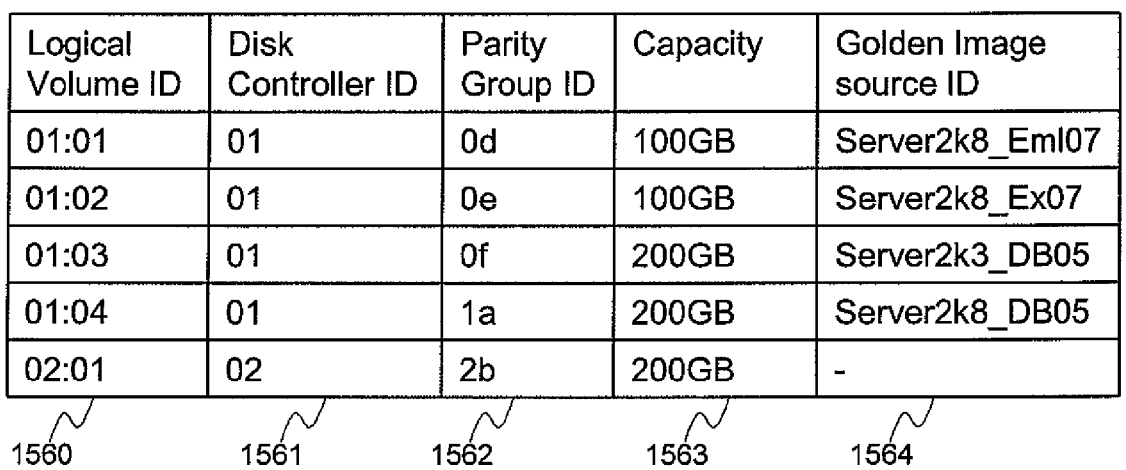
FIG. 4 illustrates an example of a Volume Management Table in the memory of FIG. 2.

FIG. 4 illustrates the detailed example of the volume management table 156. The volume management table 156 contains information of volumes such as a logical volume ID 1560, a disk controller ID 1561, a parity group ID 1562, a capacity information 1563, and a golden image source ID 1564. The golden image source ID is used for distinguishing its data content when allocating a port to each volume.

FIG. 5 illustrates the detailed example of the golden image management table 157. The golden image management table 157 contains information such as an identifier of a golden image data 1570, an identifier of logical volume 1571 that stores a golden image, operating system information 1572, and installed application information 1573.

FIG. 6 illustrates the detailed example of the port attribute management table 158. In this embodiment, since the port attribute is represented as information of a golden image information to be associated with each port, the port attribute management table 158 contains at least port ID 1580 and associated golden image identifier 1581. The port ID 1580 can be either a port name or a port WWN as long as it can identify each port in the storage system 100.

FIG. 7 illustrates the detailed example of the path management table 159. This table contains at least a logical volume ID 1590 and a port ID 1591.

FIG. 8 illustrates the detailed example of the LUN mapping table 15a. The LUN mapping enables a specific host computer to access to a specific logical volume in the storage system 100 by associating a port identifier of the host computer and the logical volume identifier such as LUN (logical unit number) in the storage system 100. This table contains at least a host port identifier 15a0, a storage port ID 15a2, and a logical volume ID 15a3.

Figure 3:
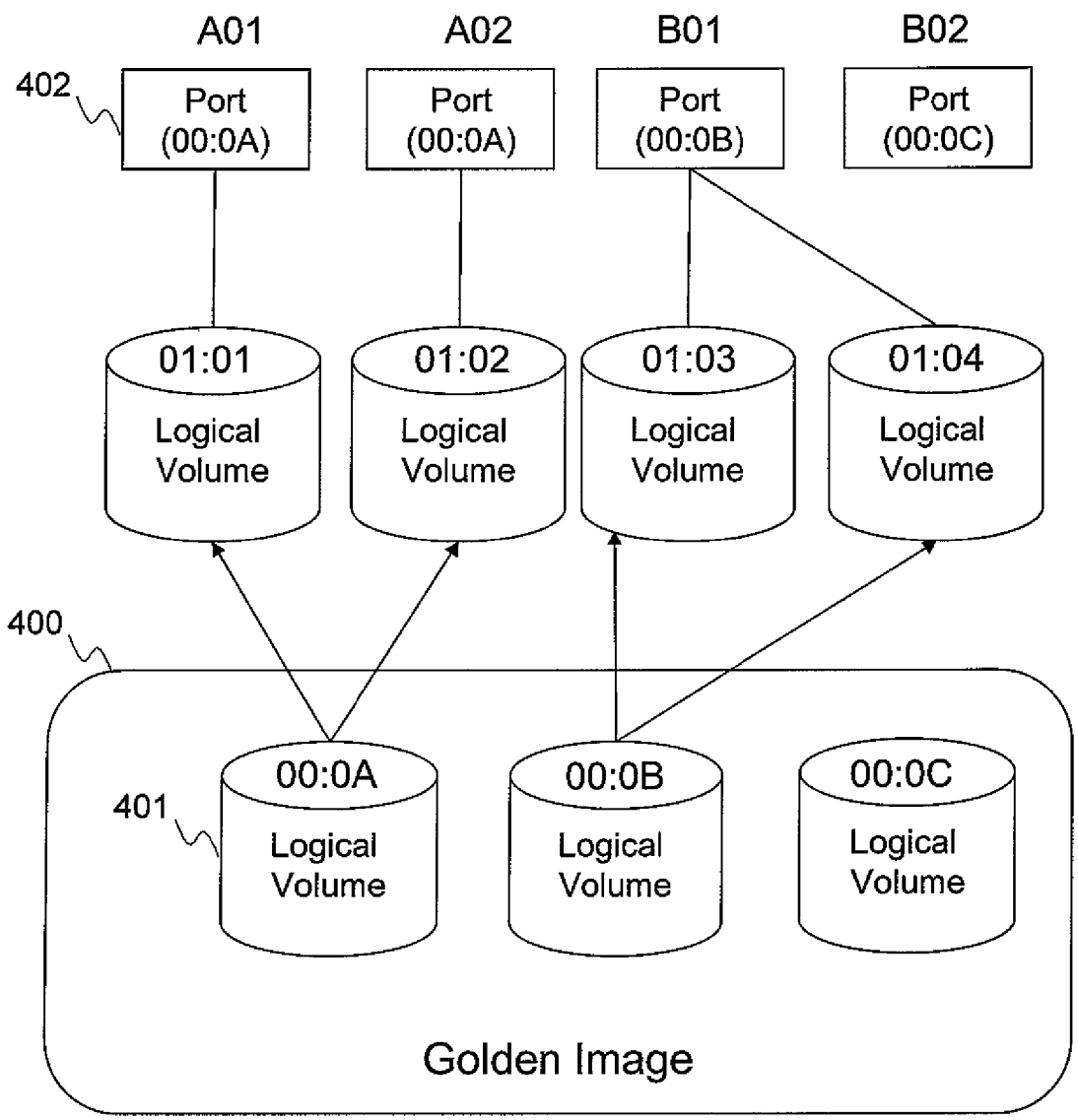
FIG. 3 illustrates a basic concept of golden image distribution according to the first embodiment of the invention.

FIG. 3 illustrates a basic concept of golden image distribution according to the first embodiment of the invention. A golden image is defined as a master image of a system or application for a physical or virtual environment. A golden image data is used as a copy or a clone source whereas the copied data is used as an actual data to be accessed from the host computer. There are several ways of creating an original data for a golden image as follows. For example, an administrator may create the golden image prior to installing a server operating system and application to other devices. The administrator may install the server operating system to the created volume by directly using an install media and then install the application on it. Furthermore, the content of the golden image can be either of the following examples. First, it may a SAN boot image that is accessed by the host computer 500 to run a server or other computing environment directly from the logical volume in the storage system 100. Second, it may be one or plurality of virtual disk files that are used to provision one or plurality of virtual machines at one time.

In FIG. 3, ports, A01, A02, A01 and B04, are contained in the SAN interface 110 in FIG. 1, and the barrel-shaped object represents a logical volume that comprises one or plurality of hard disks. The storage system 100 may contain a plurality of different golden images. For example, FIG. 3 shows three golden images stored in logical volumes within an area surrounded by a solid line 400. Then, the golden image is copied with execution of the data copy program 153, to logical volumes specified as target volumes. For example, the golden image data stored in a logical volume 00:0A is requested to be copied to a logical volume 01:01 and 01:02, and the golden image data stored in a logical volume 00:0B is requested to be copied to a logical volume 01:03 and 01:04. Assuming that a port A01 and A02 are associated with the golden image stored in the logical volume 00:0A and a port B01 is associated with the golden image stored in the logical volume 00:0B, a logical path is set based on a source golden image information as shown in FIG. 3 (the port A1 and A2 for each logical volume 01:01 and 01:02, and the port B01 for the logical volume 01:03 and 01:04).

Figure 9:
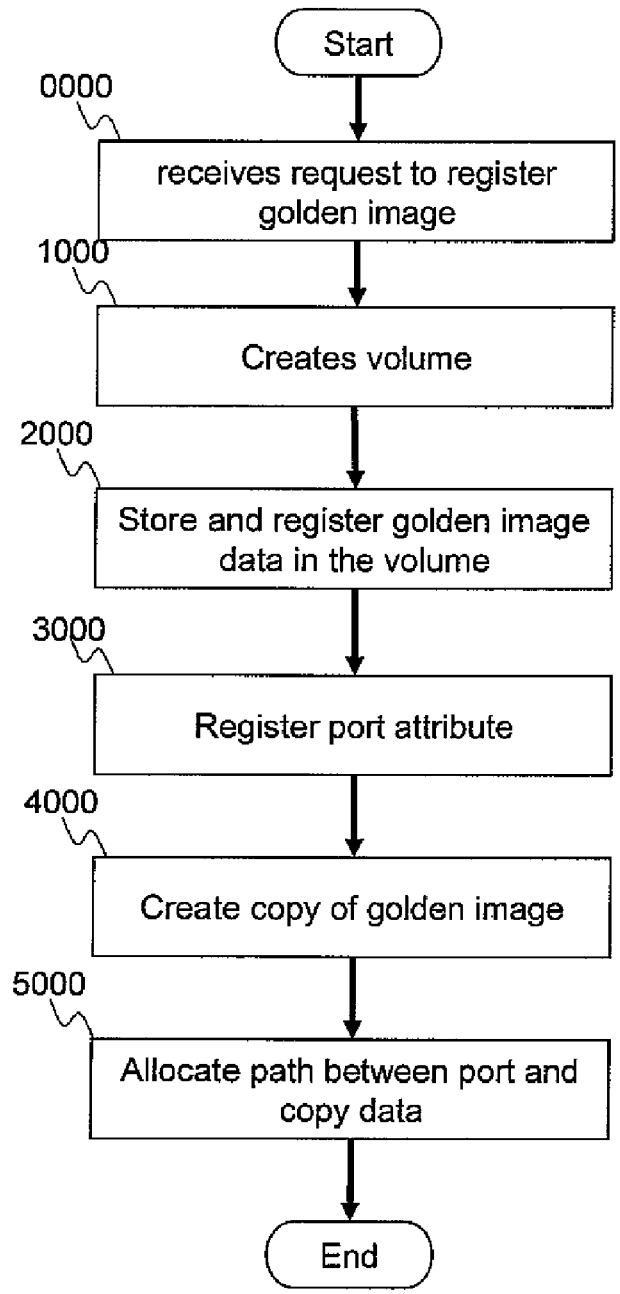
FIG. 9 illustrates an example of a process flow to set up a storage system.

FIG. 9 illustrates an example of a process flow to set up the storage system 100. First, the storage controller 180 receives a request to register a golden image from an administrator (step 0000). Then, the storage controller calls the volume management program 152 to create a volume based on the request (step 100). The volume creation process is further explained in FIG. 10. The storage controller 180 then stores a golden image data and register it as a golden image (step 2000), and associates a port with the golden image (step 3000). The storage controller 152 calls the data copy program 153 to copy the golden image data to one or plurality of logical volumes so that the copied golden image can be used as an actual data to be accessed from the host computer (step 4000). Finally, the storage controller 180 calls the path allocation program to allocate an internal path between a port and the copied data (step 5000).

Figure 10:
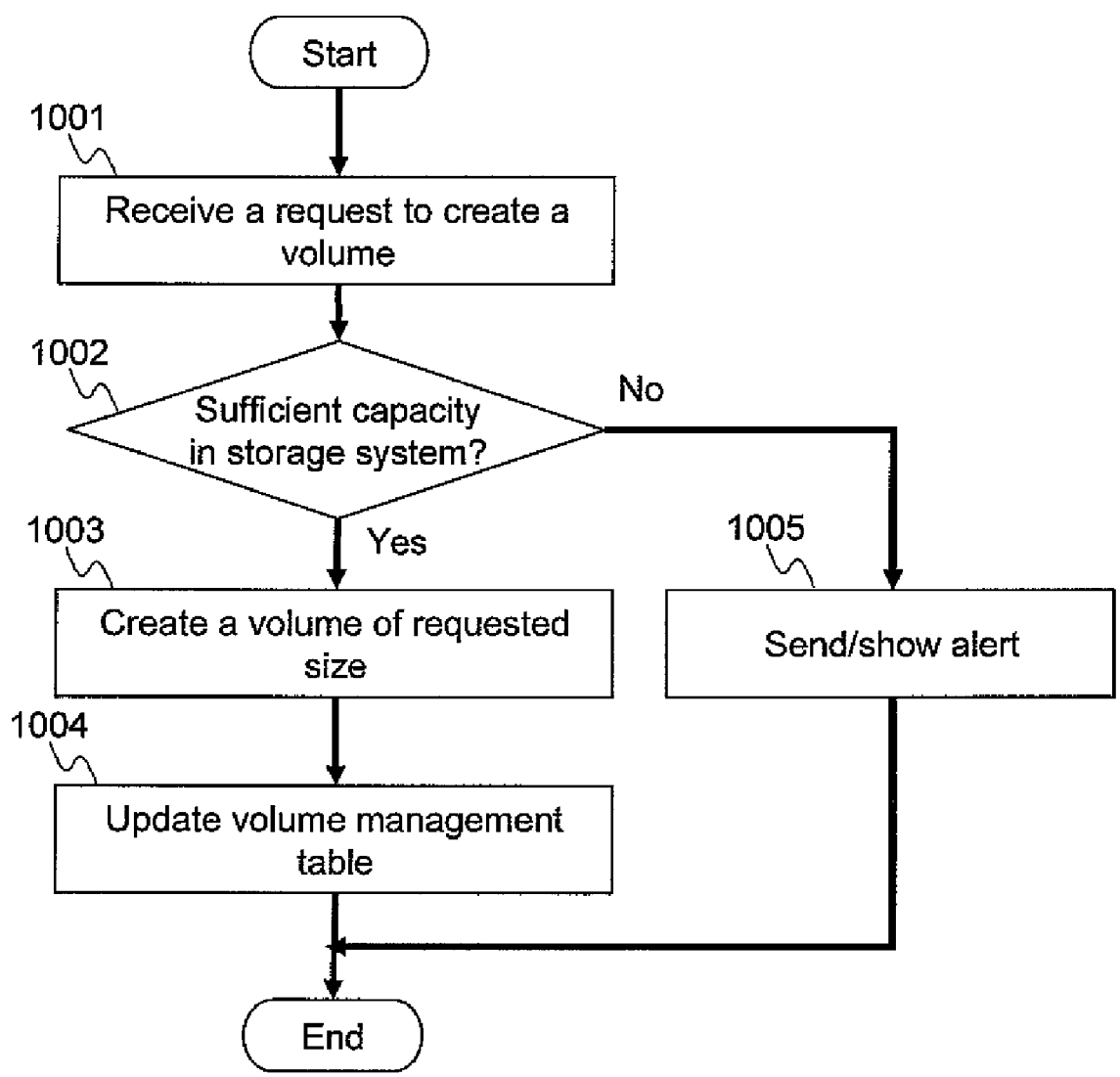
FIG. 10 illustrates a process flow of a process flow of a volume creation executed with a Volume Management Program in the storage system according to the first embodiment of the invention.

FIG. 10 illustrates a process flow of a process flow of the volume creation executed with the Volume Management Program 152 in the storage system 100 according to the first embodiment of the invention. First, the storage controller 180 receives a volume creation request from the administrator and transfers the request to the volume management program 152. The request includes at least a volume capacity information (step 1001). Here, the volume capacity information can be either input from the administrator or automated recognition by a golden image data size. The volume management program 152 searches for an available capacity in the storage system 100, and if the storage system 100 has available disks or parity groups that satisfy the capacity demand (step 1002 yes), it creates a volume with the capacity (step 1003). After creating the volume with the capacity, the volume management program 152 updates the volume management table 156 (step 1004). If the storage system 100 has no available disks or parity groups (step 1002 no), it sends or shows alert to the administrators step 1005). The alert may include a suggestion for administrator to add a particular amount of capacity or a particular number of disks.

Figure 11:
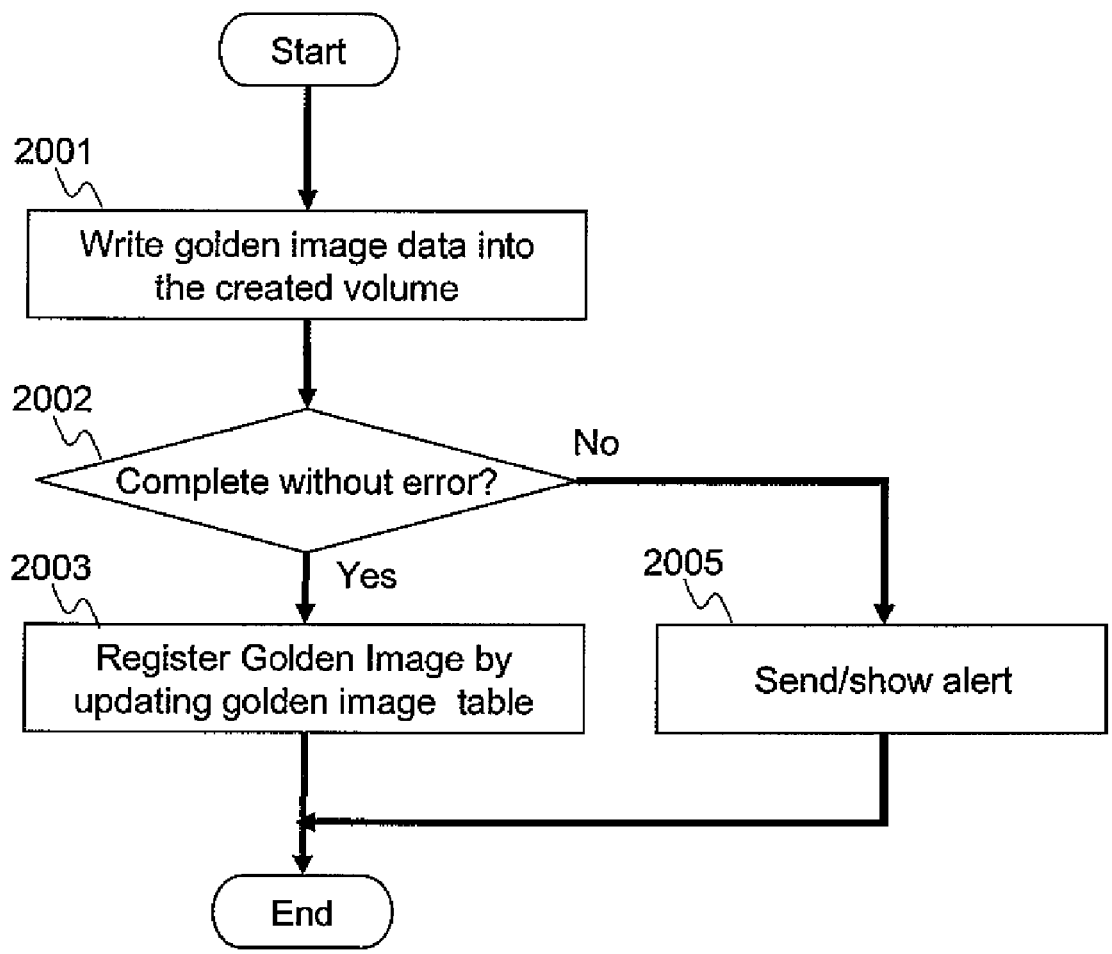
FIG. 11 illustrates a process flow to store and register a golden image data in the storage system executed with a Golden Image Management Program according to the first embodiment of the invention.

FIG. 11 illustrates a process flow to store and register the golden image data in the storage system executed with the Golden Image Management Program 155 according to the first embodiment of the invention. First, the storage controller 180 stores the golden image data in the logical volume created in the step 1000 (step 2001). If the storing data completed without errors (step 2002 yes), the storage controller 180 registers the volume in which the golden image data is stored as a golden image volume by updating the golden image management table 157 (step 2003). The information of the golden image such as a golden image name, an operation system, an application is provided by administrator through a management window in FIG. 16. If the storing data process is terminated with error (step 2002 no), the storage controller 180 sends or shows alert (step 2005).

Figure 12:
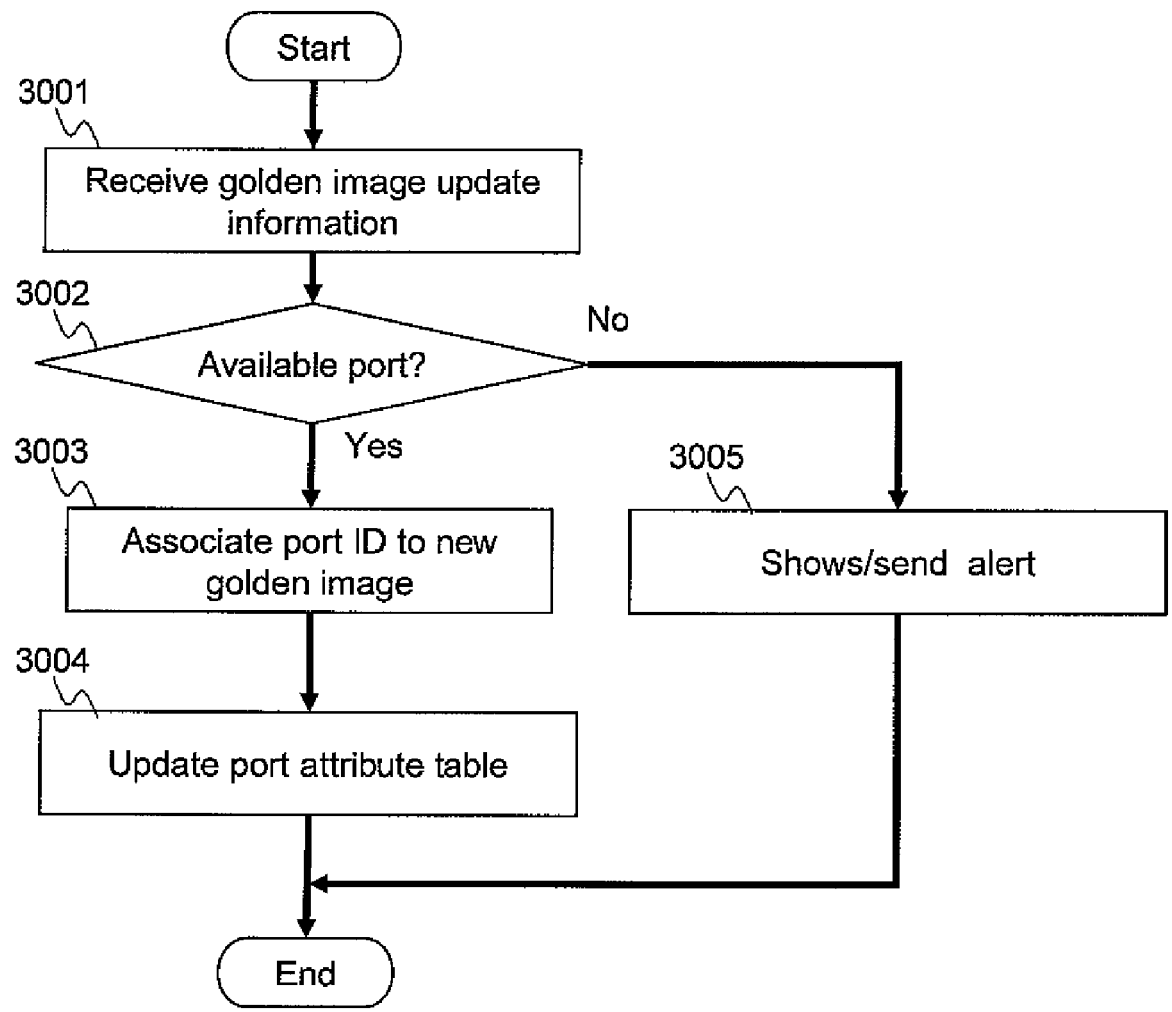
FIG. 12 illustrates a process flow to register a port attribute executed with a Golden Image Management Program according to the first embodiment of the invention.

FIG. 12 illustrates a process flow to register the port attribute executed with the Golden Image Management Program 155 according to the first embodiment of the invention. First, the golden image management program 155 in the storage controller 180 receives a golden image registration information (step 3001). Then, the program checks if there are ports not associated to any other golden image, and if yes (step 3002 yes), it associates the port ID to the newly registered golden image (step 3003). Then, the program updates the port attribute table (step 3004). If all ports are allocated to the other golden images (step 3002 no), it shows or sends an alert (step 3005).

Figure 13:
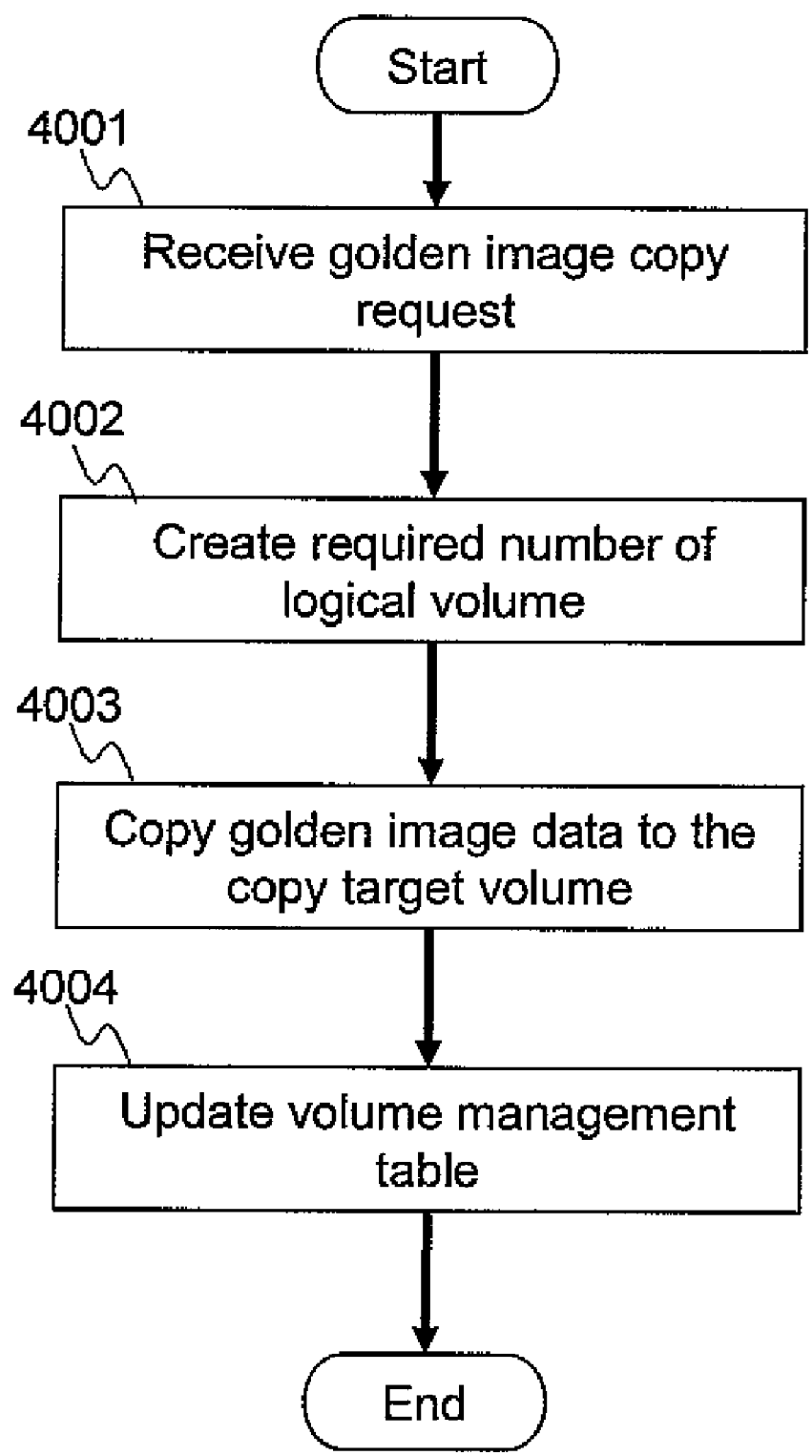
FIG. 13 illustrates a process flow of a golden image copy according to the first embodiment of the invention.

FIG. 13 illustrates a process flow of a golden image copy according to the first embodiment of the invention. First, the data copy program 153 receives a golden image copy request (step 4001). This request is sent from either administrator or internal program in the storage system 1001 and it contains at least identification of a golden image and numbers of copies to be created. Then, the volume management program 152 creates the required number of volumes (step 4002). The process to create each volume is the same as shown in FIG. 10. The required capacity of the volume can be the same as that of golden image source volume. After the volumes are created, the data copy program 153 copies the specified golden image data to the created volumes (step 4003). Then, the data copy program 153 updates the golden image source ID of volume management table 156 (step 4004).

Figure 14:
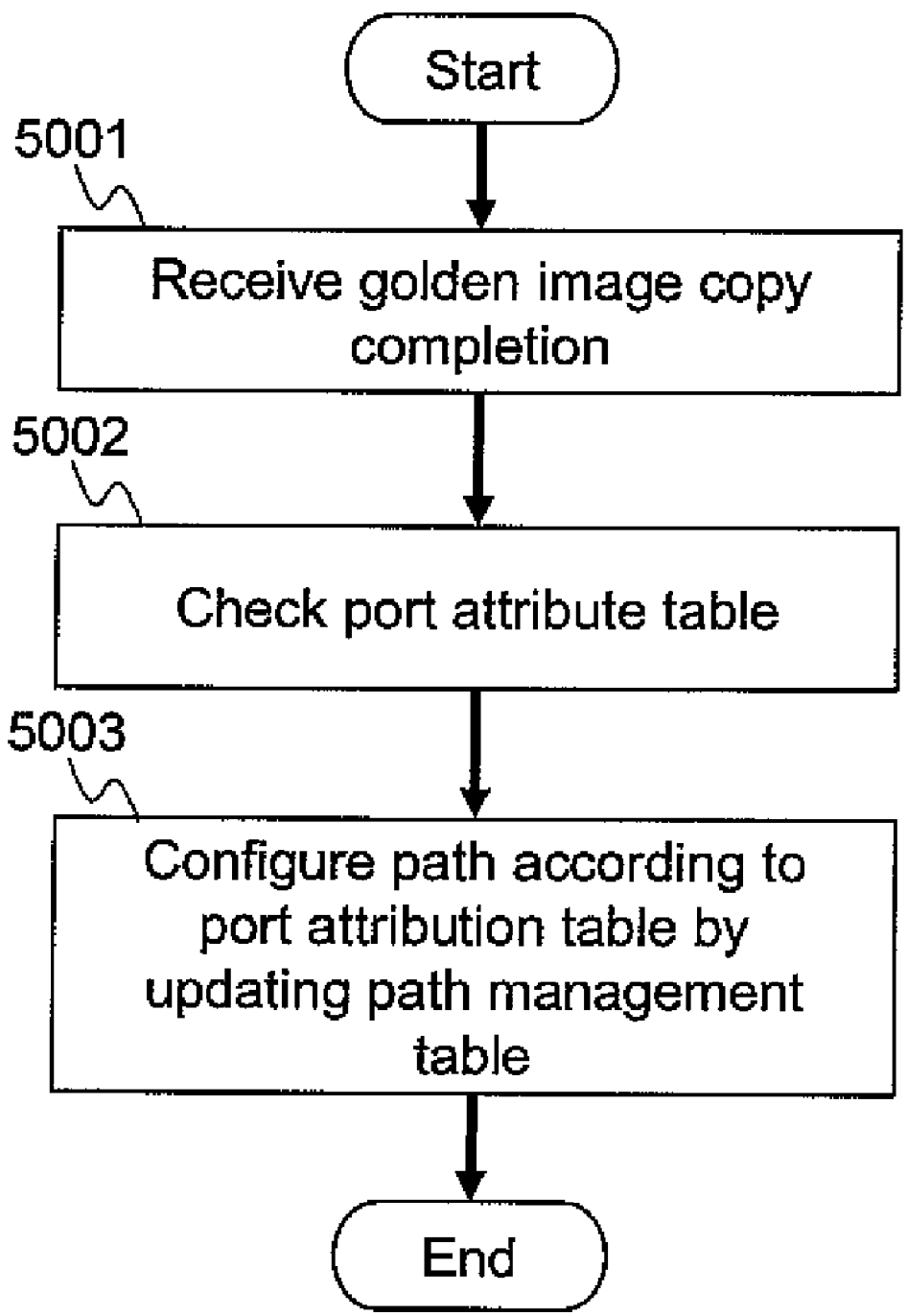
FIG. 14 illustrates a process flow of a path allocation executed with a Path Allocation Program according to the first embodiment of the invention.

FIG. 14 illustrates a process flow of the path allocation executed with the path allocation program 154 according to the first embodiment of the invention. The program 154 in the storage controller 180 receives a golden image copy completion (step 5001), and checks the port attribute table to specify a port associated with the copied golden image (step 5002). Then, it allocates a specified port to the volume that stores the copied golden image, and updates the path management table 159 (step 5003).

Figure 15:
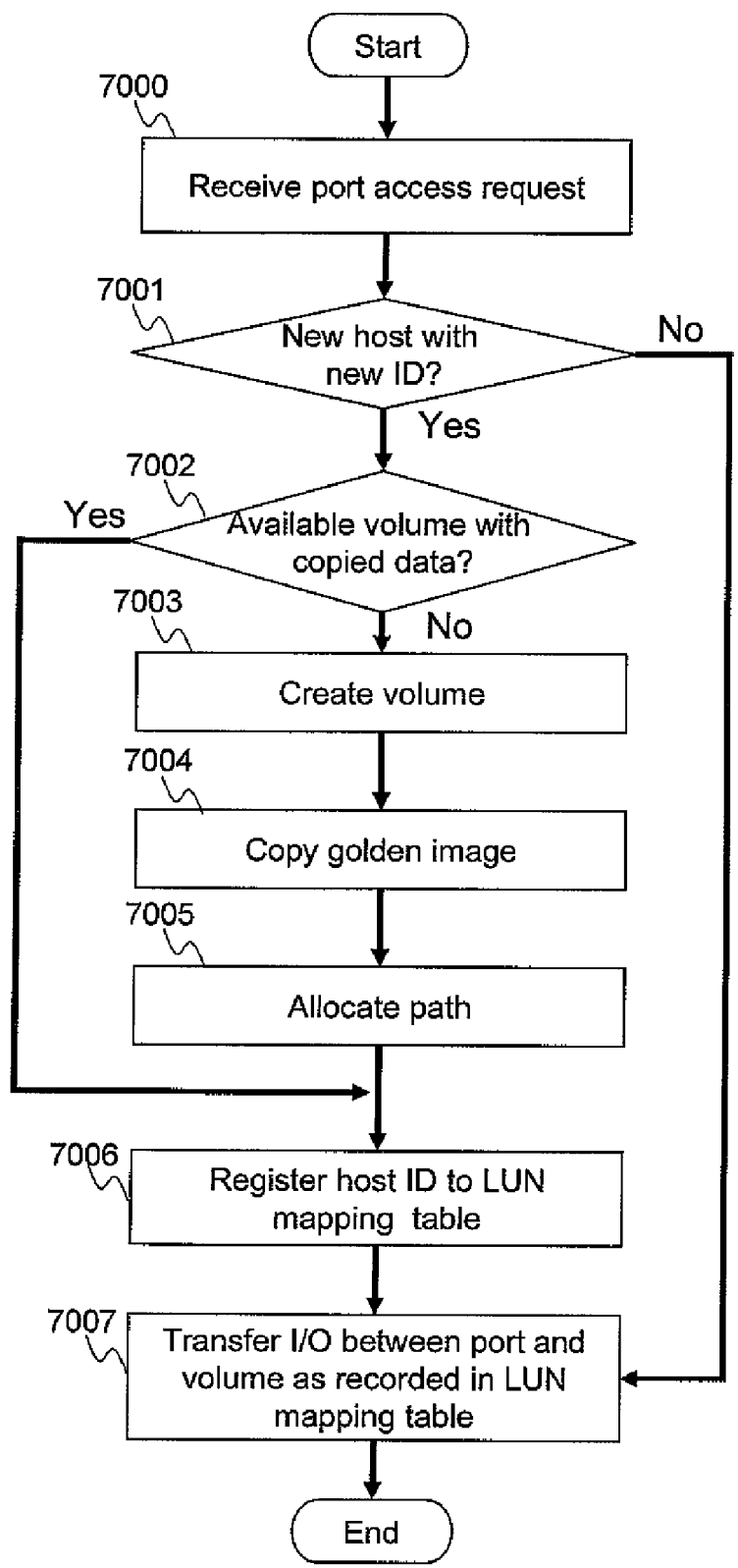
FIG. 15 illustrates a process flow of recognizing a newly accessed host computer and allocating a storage volume according to the first embodiment of the invention.

FIG. 15 illustrates a process flow of recognizing a newly accessed host computer and allocating a storage volume according to the first embodiment of the invention. First, the storage system 100 receives an access request at one of the storage port (step 7000). Then, the storage system 100 discriminates an identifier of the host port (such as HBA WWN and port WWN) and checks if it is a new access to the storage port by going through with the LUN mapping table 15a (step 7001). If it is a new host (step 7001 yes), then it checks if there is an available data volume that stores the copy of golden image associated with the storage port by going through with the volume management table 156 and LUN mapping table 15a to find a volume that stores the copy of specified golden image and not yet allocated to any host computer (step 7002). If there is an available port (step 7002 yes), it registers the host port identifier as a host accessing the volume by updating the LUN mapping table 15a (step 7006). If it does not have available volume (step 7002 no), it creates a volume (step 7003), copies the golden image data to the volume (step 7004), and then allocates a path between the volume and the port (step 7005). Then, it registers the host port identifier to the LUN mapping table 15a (step 7006). Once LUN mapping is set, the 110 control program 151 transfers I/O between the port and the volume based on the mapping information (step 7007). The golden image stored and registered in the storage system 100 can be deleted based on the administrator's request. In such a case, the necessary steps will include deleting the golden image data volume with updating the volume management table 156 and deleting the golden image information from the golden image management table 157.

Utilizing the storage system described in this embodiment, the user can simply connect the server port to the storage port associated with desired operating system and application to get the server and application execution environment.

FIGS. 16-19 shows an example of the management window. Administrator can input setting information to the management windows through any management client computer connected to the management interface 170.

Figure 16:
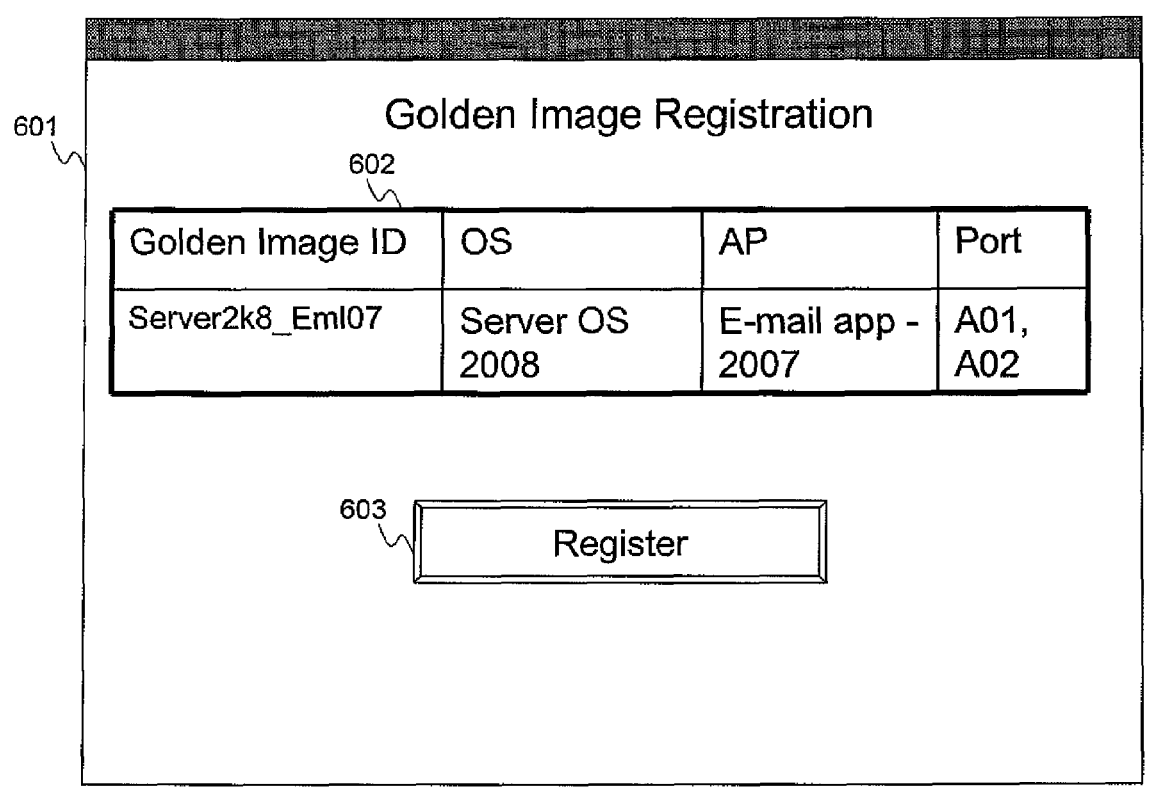
FIG. 16 illustrates an example of a management window of a Golden Image Registration.

FIG. 16 illustrates an example of the management window of the golden image registration. Administrator is able to input a golden image name and other information through this window. This window contains at least an input box for the golden image name and other information regarding the golden image. When the administrator hits "Register" button 603, the golden image creation request is sent to the storage system 100. This setup window can be followed by a window to specify a source data location or an operating system installation wizard.

FIG. 17 illustrates an example of the management window of the golden image list. With this screen, administrator is able to decide which port to access. This window contains at least a port ID and information of the golden image associated with the port.

Figure 18:
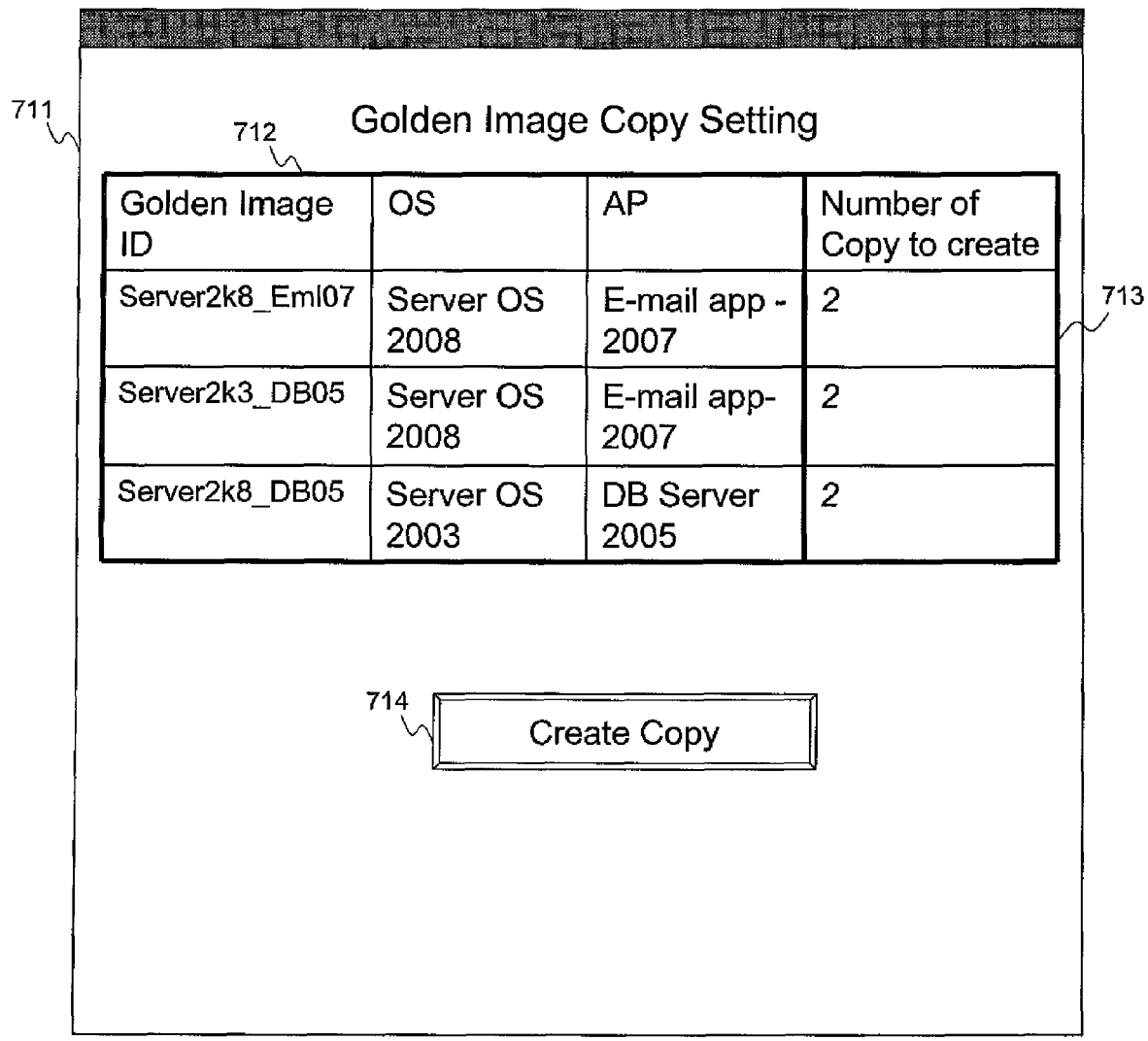
FIG. 18 illustrates an example of a management window of a Golden Image Copy Setting.

FIG. 18 illustrates an example of the management window of the golden image copy setting. With this screen, administrator is able to input the number of copy for each golden image in each input field 713. When administrator hits "Create Copy" button, the copy creation request is sent to the storage system 100.

Figure 19:
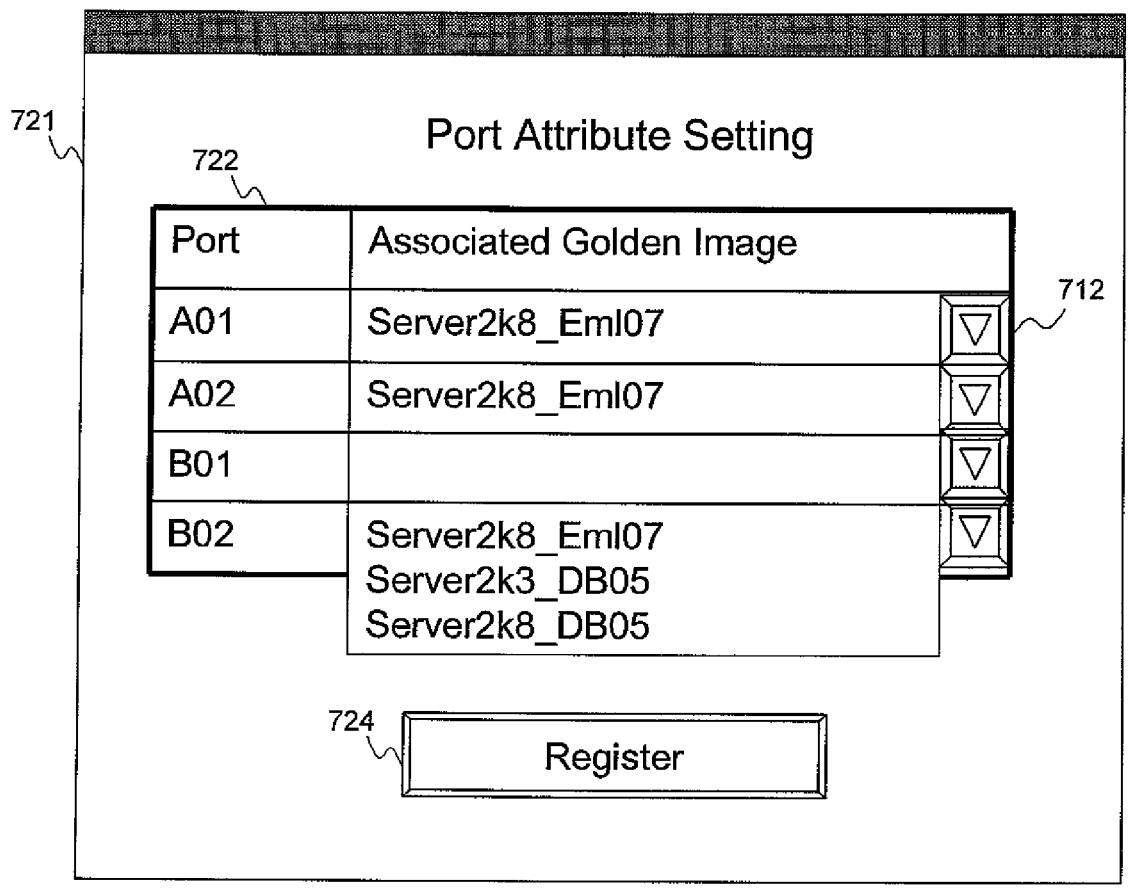
FIG. 19 illustrates an example of a management window of a Port Attribute Setting.

FIG. 19 illustrates an example of the management window of the port attribute setting. With this screen, administrator is able to input identifier of a golden image in each input field 723. The stored golden image can be listed as a drop-down list so that the administrator can simply select one. When the administrator hits "Register" button, the port attribute registration request is sent to the storage system 100.

Possible variation of this embodiment is that the port attribution can be alternated with a network switch port attribution or zone setting attribution in a SAN switch. In those cases, the storage port identifier to be associated with the golden image in the port attribute table 158 is replaced with the network switch port identifier or the zone identifier. In both cases, since each storage port is connected one of the switch or zone, the system or method explained in this embodiment will work in the same way.

Second Embodiment

In the second embodiment, each SAN interface port in the storage 100 can be associated with a plurality of the golden images. In this case, the computer system provides an interface to select a golden image associated with each port.

Figure 20:
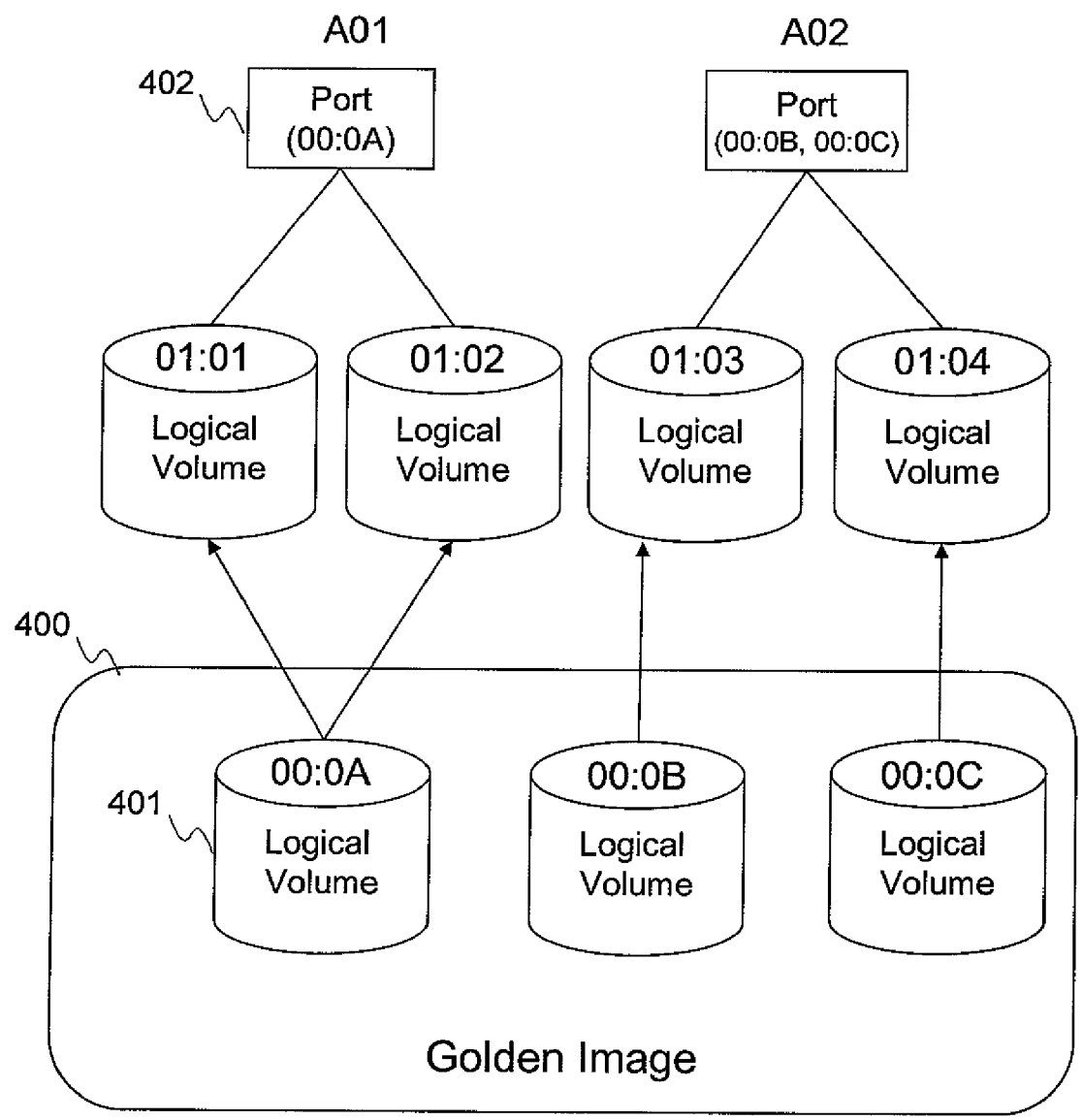
FIG. 20 illustrates a basic concept of a golden image distribution according to the second embodiment of the invention.

FIG. 20 illustrates a basic concept of the golden image distribution according to the second embodiment of the invention. Ports A01 and A02 are contained in the SAN interface 110 in FIG. 1, and the barrel-shaped object represents a logical volume that comprises one or plurality of hard disks and logically separated. The storage system 100 may contain a plurality of different golden images. FIG. 20 shows three golden images stored in logical volumes within an area surrounded by a solid line 400. Those golden images are managed with the golden image management table 157.

Then, the golden image is copied with execution of the data copy program 153, to logical volumes specified as target volumes. For example, the golden image data stored in a logical volume 00:0A is copied to a logical volume 01:01 and 01:02, the golden image data stored in a logical volume 00:0B is copied to a logical volume 01:03, and the golden image data stored in a logical volume 00:0C is copied to a logical volume 01:04. Assuming that a port A01 is associated with the golden image stored in the logical volume 00:0A and a port A02 is associated with the golden image stored in the logical volume 00:0B and 0:00C, a logical path is set based on a source golden image information as shown in FIG. 20 (the port A1 for each logical volume 01:01 and 01:02, the port A02 for the logical volume 01:03 and 01:04). Here, the port A02 is shared with two different golden images. Therefore, the storage system 100 should be able to distinguish which golden image is intended by a user when it receives a host access request.

In order to distinguish the golden image, the user can include the golden image identifier in the access request, or the user can select one of the registered golden images using the below mentioned user interface in FIG. 22.

Figure 21:
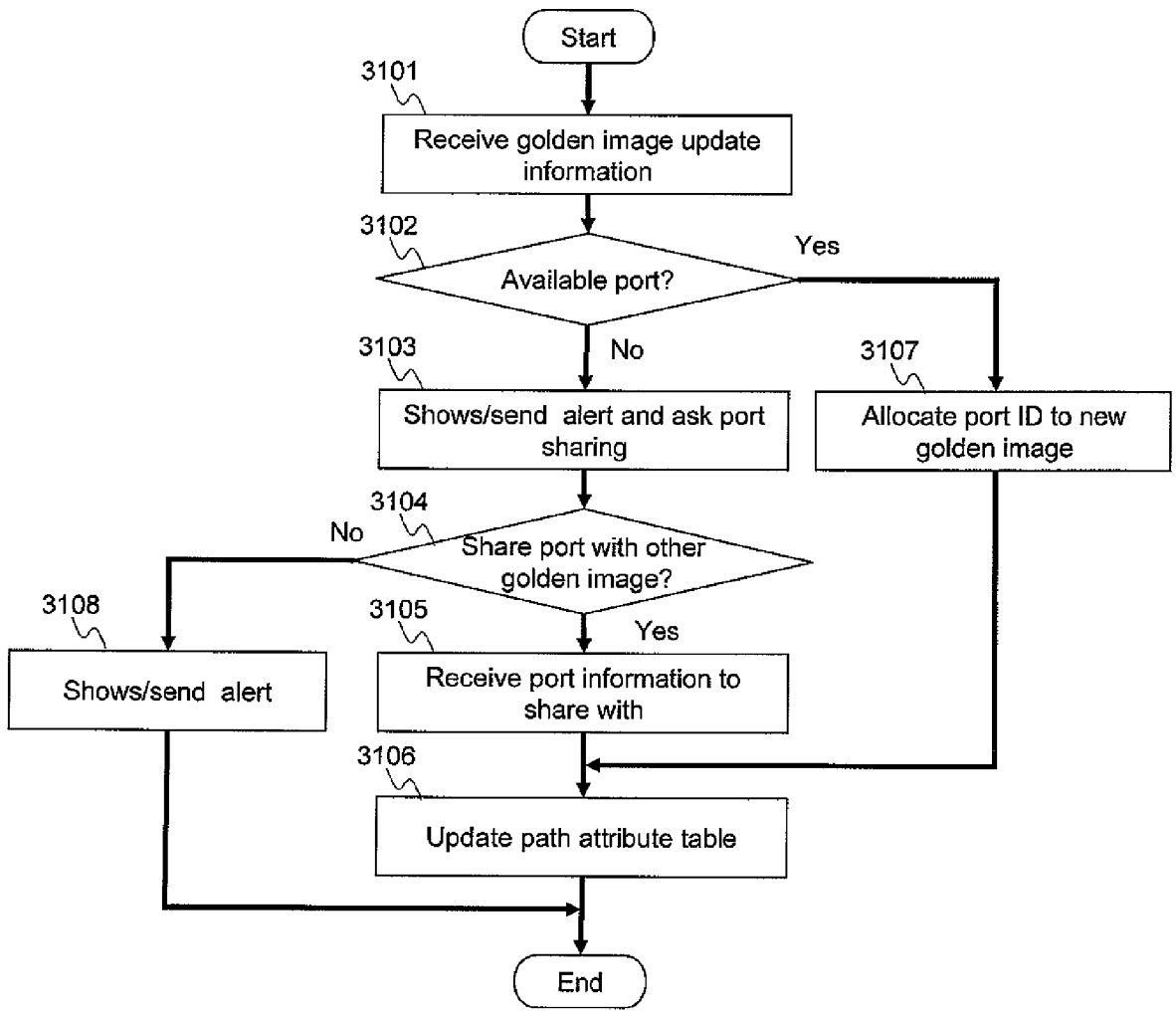
FIG. 21 illustrates a process flow to register a port attribute executed with the Golden Image Management Program.

FIG. 21 illustrates a process flow to register the port attribute executed with the golden image management program 155. First, the program 155 in the storage controller 180 receives the golden image registration information (step 3101). If there is available port not allocated other golden image (step 3101 yes), it allocates the port ID to the newly registered golden image (step 3107). Then, the program 155 updates the port attribute table (step 3106). If there is no port available, i.e. all ports have been allocated to other golden images (step 3102 no), it shows or sends an alert to administrator to ask for a port sharing with other golden image (step 3103). If the administrator allows the port sharing and specifies which golden image to share to share the port (step 3105), the program 155 updates the port attribute table according to the received information (step 3106). If the administrator does not allow the port sharing (step 3104 no), it shows or sends an alert to the user (step 3108).

Figure 22:
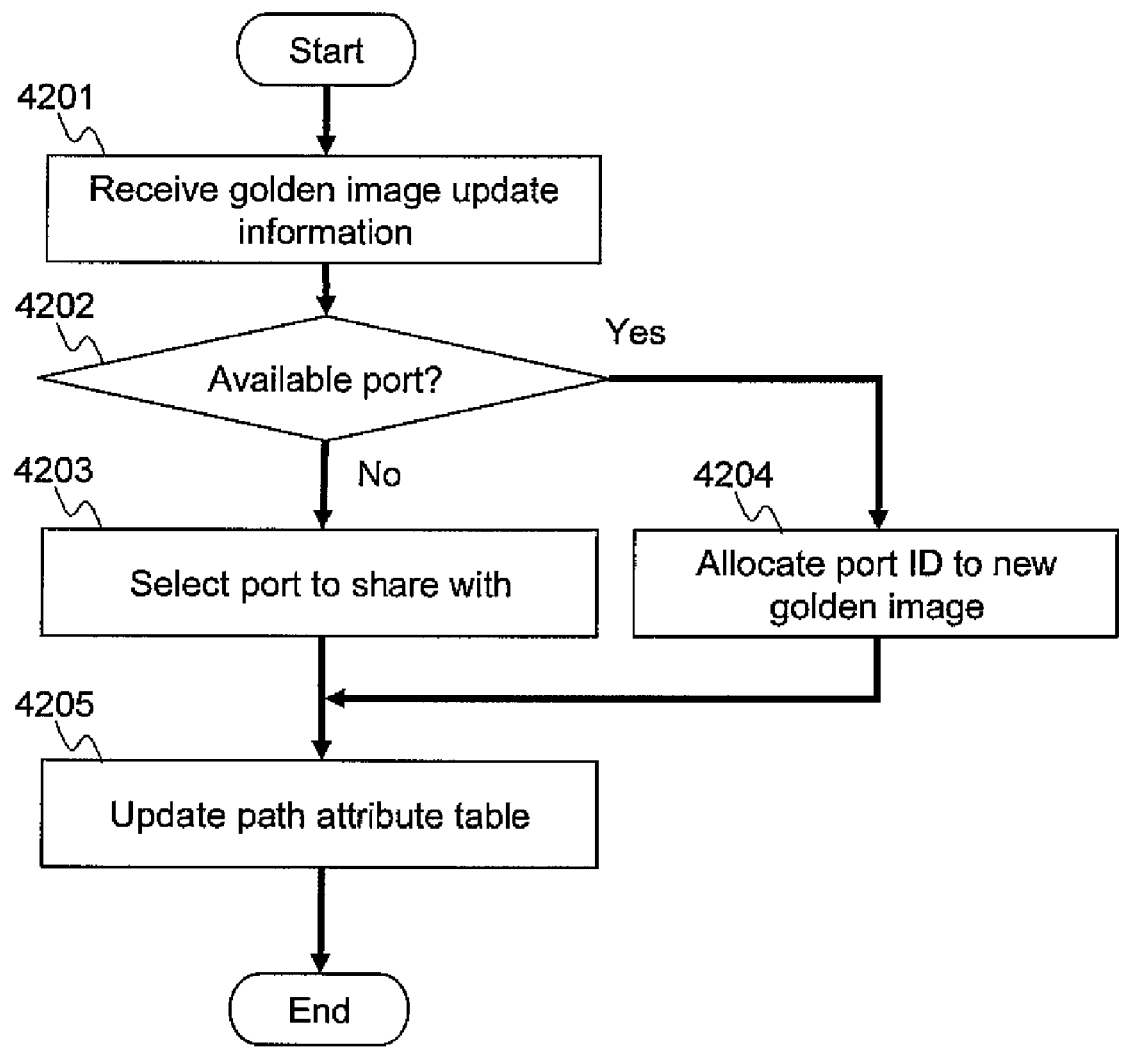
FIG. 22 shows another process flow to register a port attribute executed with the golden image management program.

FIG. 22 shows the process flow to register port attribute executed with the golden image management program 155, in which the port ID to be shared with a plurality of golden images is selected automatically. This process flow can be alternate of the process flow shown in FIG. 21. The program 155 receives golden image registration information (step 4201). If there is available port not allocated to other golden image, then it allocates the port ID to the newly registered golden image (step 4204). If there is no port available, i.e. all ports have been allocated to other golden images (step 4202 no), it selects a port to be shared between any existing golden image and the newly registered golden image (step 4203). The rule as to which port is to be selected for the port sharing could be any of following; i) selecting arbitrary port, ii) selecting a port that is shared with minimum number of golden images, iii) selecting a port that have least host access (by read or write IOPS or MB/sec) based on monitoring data, or iv) selecting a port that is associated with golden images with same category (vender) of operating system or application as the new golden image. Then, the program 155 updates the port attribute table (step 4205).

Figure 23:
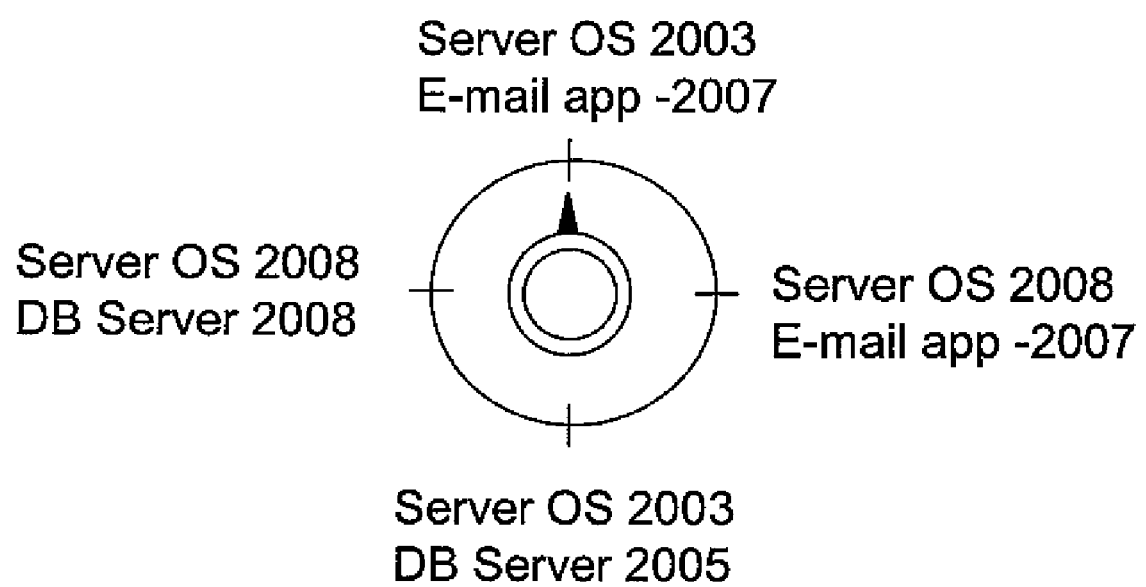
FIG. 23 shows an example of user interface to select a golden image to use.

FIG. 23 shows an example of user interface to select a golden image to use. Since this embodiment allows the storage port to share with a plurality of golden images, user should be able to select one of the golden images to use. One example shown in FIG. 23 is a dial-shaped interface that makes user select a golden image easily and intuitively. When this dial interface is deployed beside the storage port, it means that the storage port is internally associated with the selected golden image on the dial interface.

What is claimed is:

1. A system comprising:
a host computer; and
a storage system coupled to the host computer via a network;
the storage system comprising:
a plurality of ports;
a storage controller; and
a plurality of logical volumes;
wherein the storage controller is configured to:
associate between the at least one of the plurality of ports and a golden image;
receive an access request from the host computer via a port that the host computer is connected thereto; and
transfer the access request between the port and the logical volume which stores a copy of the golden image associated with the port.

2. The system of claim 1, wherein the storage controller is further configured to check if the host computer is new access to the storage system when the access request is received.

3. The system of claim 2, wherein the storage controller is further configured to, if the host computer is new access to the storage system, check if there is a logical volume which stores a copy of a golden image associated with the port.

4. The system of claim 3, wherein, if there is no logical volume which stores a copy of the golden image associated with the port, the storage controller is further configured to:
create a logical volume based on the request;
copy a golden image data to the logical volume;
and allocate an internal path between the port and the logical volume.

5. The system of claim 1, wherein at least one of the plurality of ports is associated with a plurality of golden images.

6. The system of claim 1, wherein the golden image is associated with zone setting in SAN switch in the network.

7. The system of claim 5, further comprising a user interface whereby the user can select one of the plurality of golden images.

8. The system of claim 7, wherein the user interface comprises a dial which indicates the plurality of golden images to be selected by user.

9. A system comprising:
a host computer; and
a storage system coupled to the host computer via a network;
the storage system comprising:
a plurality of ports;
a storage controller; and
a plurality of logical volumes;
wherein, upon receiving a request, the storage controller configured to:
create a logical volume based on the request;
register a golden image data as a golden image;
associate at least one of the plurality of ports with the golden image;
copy the golden image data to at least one of the plurality of logical volumes;
and allocate an internal path between the at least one of the plurality of ports and the at least one of the plurality of the logical volumes.

10. The system of claim 9, wherein the storage controller is further configured to check if there is available capacity for logical volumes in the storage system.

11. The system of claim 9, wherein the golden image is created by installing a server operation system or an application.

12. The system of claim 9, wherein the golden image is a SAN boot image.

13. The system of claim 9, wherein the golden image is at least one of virtual disk files that are used to provision at least one of virtual machines.

14. The system of claim 9, wherein the storage controller further comprises a memory which maintains a port attribute management table.

15. The system of claim 9, wherein the port attribute management table comprises information of a port ID and a golden image name.

16. The system of claim 9, wherein the storage controller is further configured to, if there is an available port for the registered golden image, associate the available port with the registered golden image.

17. The system of claim 9, wherein the storage controller is further configured to receive a golden image copy request which comprises identification of golden image and required number of copies to be created for the golden image.

18. The system of claim 9, wherein the storage controller further comprises a memory which maintains a path management table.

19. The system of claim 18, wherein the path management table comprises information of a logical volume ID and a port ID.

20. The system of claim 18, wherein the storage controller further updates the port attribute management table when the internal path between the one of the plurality of ports and the one of the plurality of the logical volumes is allocated.

* * * * *